US006956495B2

(12) United States Patent
Klein et al.

(10) Patent No.: US 6,956,495 B2
(45) Date of Patent: Oct. 18, 2005

(54) SYSTEM AND METHOD FOR REMOTE OPENING OF HANDICAP ACCESS DOORS

(75) Inventors: Christopher J. Klein, Holland, MI (US); Thomas L. Welling, Holland, MI (US); Kurt A. Dykema, Holland, MI (US); Mark S. Baynham, Madison Heights, MI (US); Fanie Duvenhage, Phoenix, AZ (US)

(73) Assignees: oneLINK, Holland, MI (US); Microchip Technology Incorporated, Chandler, AZ (US)

(*) Notice: Subject to any disclaimer, the term of this patent is extended or adjusted under 35 U.S.C. 154(b) by 558 days.

(21) Appl. No.: 09/862,857

(22) Filed: May 22, 2001

(65) Prior Publication Data

US 2002/0175827 A1 Nov. 28, 2002

(51) Int. Cl.$^{7}$ .......................... H04Q 1/18; G08C 19/00

(52) U.S. Cl. .......................... 340/825.19; 340/825.69; 340/825.72

(58) Field of Search ...................... 340/825.19, 825.69, 340/825.72

(56) References Cited

U.S. PATENT DOCUMENTS

| | | | | |
|---|---|---|---|---|
| 3,824,752 | A * | 7/1974 | Weston | 52/176 |
| 4,853,524 | A * | 8/1989 | Yamaguchi et al. | 235/468 |
| 5,442,340 | A | 8/1995 | Dykema | 340/825 |
| 5,479,155 | A | 12/1995 | Zeinstra et al. | 340/825 |
| 5,515,649 | A * | 5/1996 | Strab | 49/280 |
| 5,541,585 | A * | 7/1996 | Duhame et al. | 340/5.62 |
| 5,583,485 | A | 12/1996 | Van Lente et al. | 340/525 |
| 5,614,885 | A | 3/1997 | Van Lente et al. | 340/525 |
| 5,614,891 | A | 3/1997 | Zeinstra et al. | 340/825 |
| 5,619,190 | A | 4/1997 | Duckworth et al. | 340/825 |
| 5,627,529 | A | 5/1997 | Duckworth et al. | 340/825 |
| 5,646,701 | A | 7/1997 | Duckworth et al. | 340/825 |
| 5,661,651 | A | 8/1997 | Geschke et al. | 364/424 |
| 5,661,804 | A | 8/1997 | Dykema et al. | 380/21 |
| 5,686,903 | A | 11/1997 | Duckworth et al. | 340/825 |
| 5,699,054 | A | 12/1997 | Duckworth | 340/825 |
| 5,699,055 | A | 12/1997 | Dykema et al. | 340/825 |
| 5,708,415 | A | 1/1998 | Van Lente et al. | 340/525 |
| 5,854,593 | A | 12/1998 | Dykema et al. | 340/825 |
| 5,898,397 | A * | 4/1999 | Murray | 341/176 |
| 5,903,226 | A | 5/1999 | Suman et al. | 340/825 |
| 5,936,544 | A * | 8/1999 | Gonzales et al. | 340/5.22 |
| 5,945,936 | A * | 8/1999 | Issa | 341/176 |
| 6,049,289 | A * | 4/2000 | Waggamon et al. | 340/5.23 |
| 6,154,544 | A * | 11/2000 | Farris et al. | 380/262 |
| 6,166,650 | A * | 12/2000 | Bruwer | 340/5.26 |
| 6,707,377 | B2 * | 3/2004 | Piper et al. | 340/427 |

* cited by examiner

*Primary Examiner*—Michael Horabik
*Assistant Examiner*—Scott Au
(74) *Attorney, Agent, or Firm*—Price, Heneveld, Cooper, DeWitt & Litton, LLP

(57) ABSTRACT

A control system for remotely activating an automatically opening door according to the present invention includes a plurality of transmitters held by different people and each transmitter transmits control signals. The system further includes a plurality of doors at least some of which are mounted in different buildings. Each of the doors includes an actuator for automatically opening and closing the door and a receiver electrically coupled to the actuator for receiving control signals from the transmitters and activating the actuator to open the door in response to the receipt of the control signals. In this system, any one of the transmitters may be used to open any of the doors.

11 Claims, 4 Drawing Sheets

SYSTEM AND METHOD FOR REMOTE OPENING OF HANDICAP ACCESS DOORS

BACKGROUND OF THE INVENTION

The present invention generally relates to systems and methods for the actuation of automatically opening handicap access doors.

Many public and private facilities are equipped with automatic door openers. Some open by detecting motion as someone approaches. Most public facilities require the pressing of a button mounted on a wall or post. An example of such a system is shown in FIG. 1. While these button-activated doors are functional, for some physically disabled individuals, the buttons are inconvenient and may be difficult to press depending upon the particular disability of the individual. For example, individuals with Cerebral Palsy may have great difficulty reaching and depressing the button. Quadriplegics generally cannot press these buttons at all. Blind individuals often have difficulty locating these buttons.

Another problem associated with button-actuated automatic doors is that they open very slowly to allow individuals with all types of disabilities to move from the button to the door before it begins to close. While this is effective to allow all individuals to effectively use the door, the slowness of the door opening may be frustrating to some disabled individuals who are capable of moving quickly towards the door. This problem is exasperated in cold and/or rainy weather.

SUMMARY

Accordingly, it is an aspect of the present invention to provide a mechanism for remotely activating an automatic door that does not require a user to press a preconfigured dedicated button associated with the door. It is another aspect of the present invention to provide a system whereby the means for activating a door may be specially configured for each disabled individual so as to provide a mechanism that is the easiest to operate for that particular individual. Another aspect of the present invention is to enable such a system to open any public door as well as certain private doors. Still another aspect of the present invention is to provide an open standard that defines a wireless link for public access.

To achieve these and other aspects, features, and advantages, a control system for remotely activating an automatically opening door according to the present invention comprises: a plurality of transmitters held by different people, each transmitter transmits control signals; a plurality of doors at least some of which being mounted in different buildings, each of the doors including an actuator for automatically opening and closing the door; and a receiver electrically coupled to the actuator for receiving control signals from the transmitters and activating the actuator to open the door in response to the receipt of the control signals. In this system, any one of the transmitters may be used to open any of the doors.

Another aspect of the present invention is to provide a receiver for an automatic door assembly having a door and an actuator coupled to the receiver for automatically opening and closing the door in response to an activation signal. The receiver of the present invention comprises: a receiver circuit for receiving a rolling code control signal from a remote transmitter and a control circuit coupled to the actuator and the receiver circuit, wherein the control circuit is configured to decrypt any received rolling code control signal using a specific public key and to determine whether any received consecutive hopping codes are decrypted that correspond to consecutive codes of a rolling code algorithm. The control circuit supplies the activation signal to the actuator when any received consecutive hopping codes are decrypted that correspond to consecutive codes of the rolling code algorithm.

Another aspect of the present invention is to provide a transmitter for remotely activating an automatic door having a door, an actuator for automatically opening and closing the door in response to an activation signal, and a receiver coupled to the actuator for supplying the activation signal in response to the receipt of a rolling code control signal having consecutive hopping codes that correspond to consecutive codes of a rolling code algorithm. The transmitter of the present invention comprises: a transmitting circuit for transmitting control signals and a control circuit for generating and encrypting a rolling code control signal using a public key, the rolling code control signal including a plurality of consecutive hopping codes, the sequence of which is determined in accordance with the same rolling code algorithm used by the receiver.

These and other features, advantages, and objects of the present invention will be further understood and appreciated by those skilled in the art by reference to the following specification, claims, and appended drawings.

DETAILED DESCRIPTION OF THE PREFERRED EMBODIMENT

Figure 2:
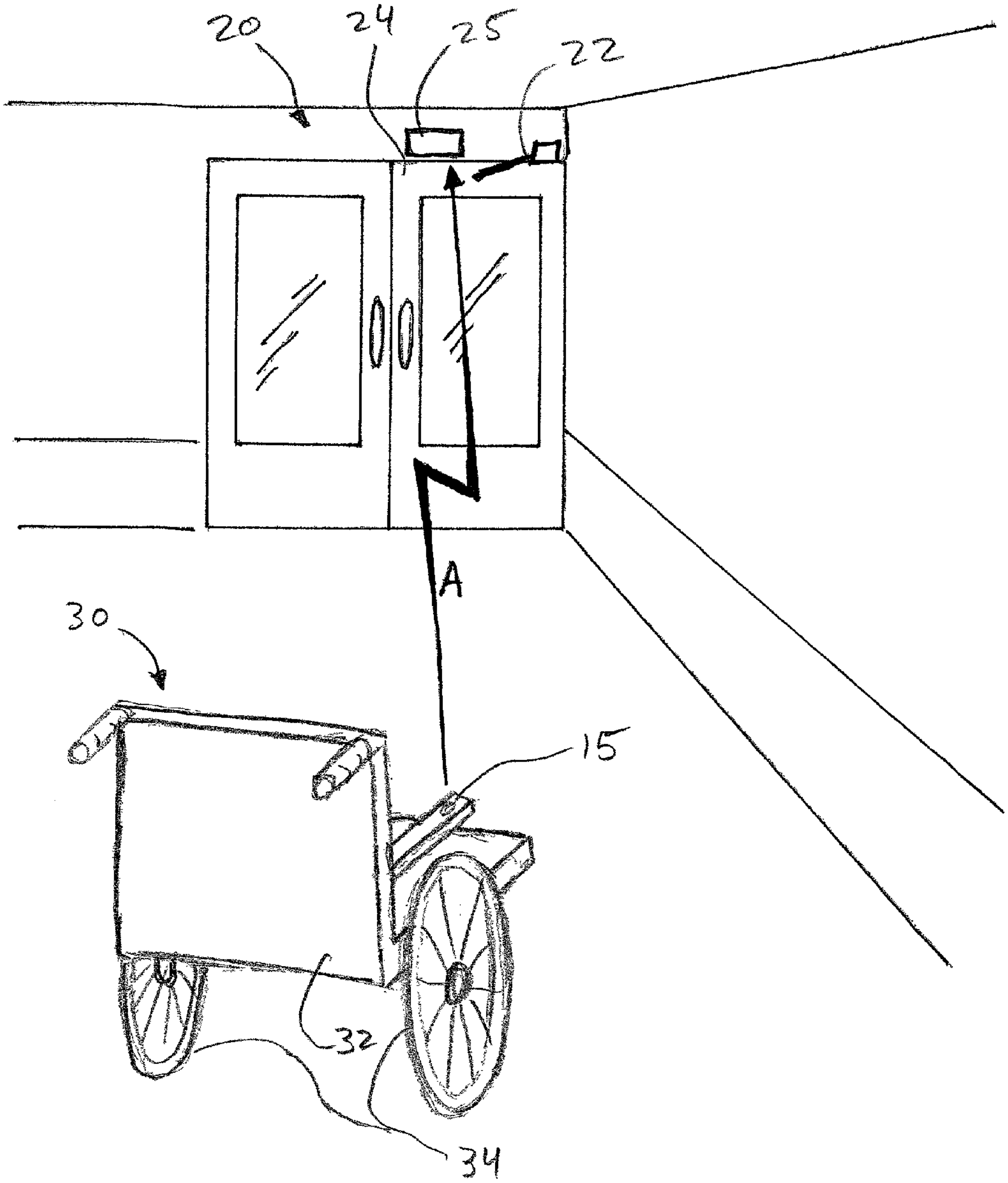
FIG. 2 is a perspective view of an automatic door opening system of the present invention.
Figure 3:
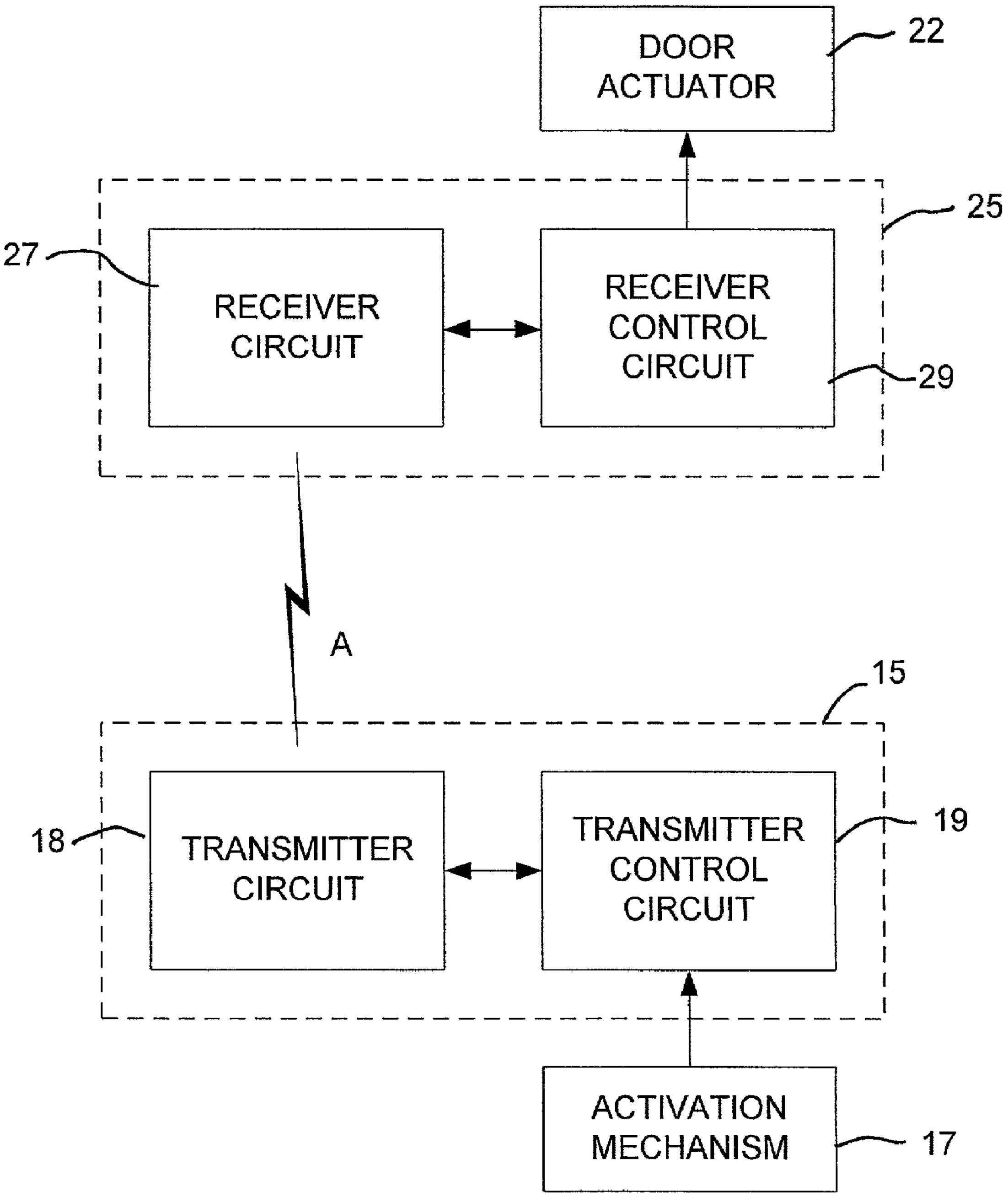
FIG. 3 is an electrical circuit diagram in block form of the control system of the present invention.

FIGS. 2 and 3 show the control system of the present invention. As illustrated, system 10 includes a transmitter 15 for transmitting a control signal A. System 10 further includes at least one automatic door assembly 20 including door 24 and an actuator 22 that, when activated, automatically opens and subsequently closes door 24. Automatic door assembly 20 further includes a receiver 25 electrically coupled to actuator 22 for receiving the control signal A from transmitter 15 and for activating actuator 22 in response to the control signal. As shown in FIG. 2, transmitter 15 may be mounted to a support structure 32 of a wheelchair 30, which has a pair of wheels 34 rotatably mounted to support structure 32. An activation mechanism 17 (FIG. 3), which is coupled to transmitter 15, may be mounted in any location on wheelchair 30 and may take any form so as to make it as easy as possible for the individual to actuate transmitter 15. Activation mechanism 17 may be a conveniently located pushbutton or toggle switch, or may be a mechanism of the type that may be activated by a quadriplegic's tongue. Mechanism 17 may also be a voice or sound activated structure.

As explained further below, an unlimited number of transmitters may all be used to open any of an unlimited number of different automatic doors that may be on many different buildings. More specifically, the present invention pertains to an open standard by which manufacturers of such systems may make the respective transmitters and automatic doors such that any one transmitter will operate any of the automatic doors. In this manner, a disabled person may use such a transmitter to open any door that is constructed under the open standard.

The security of facilities equipped with automatic doors that respond to the transmitted control signals is no different than the security of conventional systems. When the facility is locked, the receiver is disabled just as the buttons on the post are disabled.

Transmitter 15 and receiver 25 may have any conventional structure and may be an infrared (IR) or preferably a radio frequency (RF) transmitter/receiver. As shown in FIG. 3, such a transmitter 15 would generally include a transmitter circuit 18 and a transmitter control circuit 19. Similarly, receiver 25 would generally include a receiver circuit 27 and a receiver control circuit 29. As will be described further below, transmitter 15 may transmit a rolling or other encrypted code. Additionally, transmitter 15 may be a trainable transmitter that is capable of learning the characteristics of an RF signal including the RF carrier frequency and code transmitted from another transmitter. Examples of such trainable transmitters are disclosed in U.S. Pat. Nos. 5,442,340; 5,479,155; 5,583,485; 5,614,885; 5,614,891; 5,619,190; 5,627,529; 5,646,701; 5,661,651; 5,661,804; 5,686,903; 5,699,054; 5,699,055; 5,708,415; 5,903,226; and 5,854,593, the disclosures of which are incorporated by reference herein. U.S. Pat. No. 5,661,804 discloses a trainable transmitter capable of learning rolling codes.

It will be appreciated by those skilled in the art that the transmitter could take the form of a transponder and the receiver could be a transceiver that transmits an interrogation signal and receives a reply signal from the transponder. In this manner, the transceiver could periodically transmit the interrogation signal and, when the transponder comes into range of the interrogation signal, and hence the door, the transponder responds to the interrogation signal by either modulating and transmitting the received interrogation signal or responding to the signal by transmitting a different control signal to which the transceiver responds by opening the door.

Figure 1:
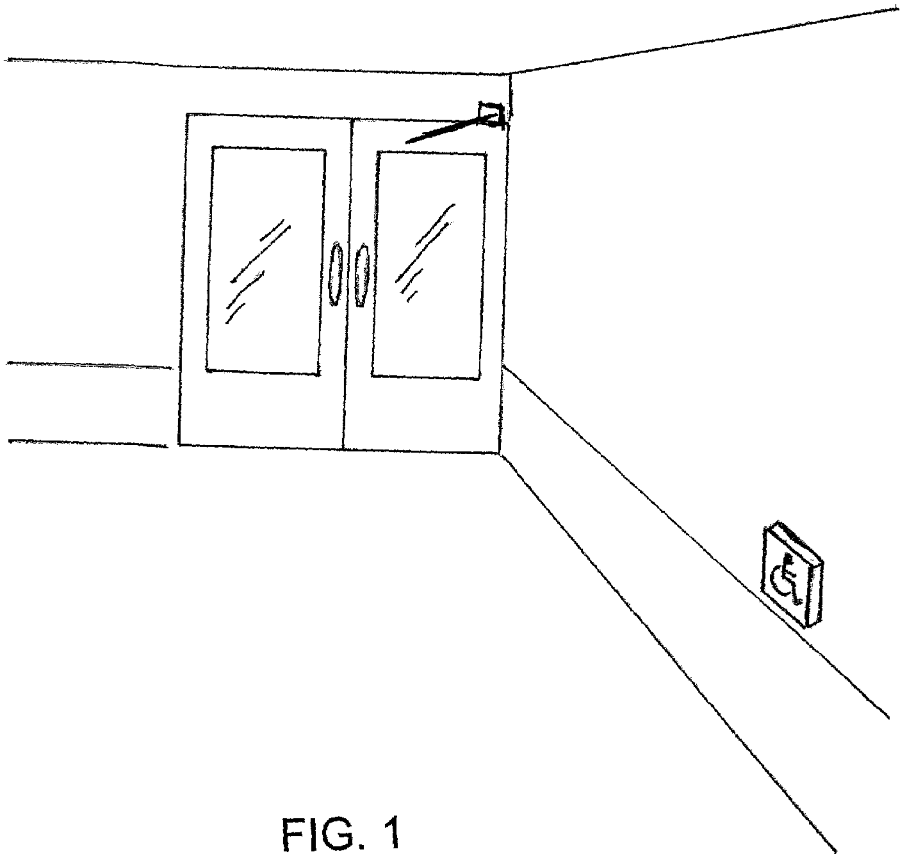
FIG. 1 is a perspective view of a conventional button-activated automatic door.

Actuator 22 and door 24 of automatic door assembly 20 may have any conventional structure since such conventional actuator structures are responsive to an electrical signal to open and close the door. In the case of the present invention, actuator 22 is responsive to an electrical signal originating from a receiver rather than a hardwired push-button of the type shown in FIG. 1.

By utilizing the system described above, the problems associated with prior art automatic doors are alleviated. Specifically, the automatic door may be modified to open more quickly so that individuals do not have to wait in the cold, rain or snow while the door opens. Moreover, because the door is not initially activated until the individual causes transmitter 15 to transmit the control signal, individuals that need more time to get to the door may wait and activate the transmitter when they are right next to the door. An additional advantage is that individuals may select the activation mechanism best suited for themselves given their particular disability.

Having generally described the structure of the system components, the radio link and data protocol of the present invention are described below.

The frequency of the transmission is preferably 433.92 MHz±25 kHz and the modulation shall be on-off-keyed (AM) modulation. The bandwidth (3 dB) of the receivers is preferably ≦200 kHz. The minimum sensitivity of the receiver may also be specified. For example, the sensitivity may be defined as the lowest power delivered to a dipole, which successfully activates the receiver under the following conditions:

50 ohm RF source;

vertical tuned dipole;

3 meter open field test site registered with the FCC; and receiver and dipole shall be mounted 1 meter above the ground.

Other testing conditions may be used for establishing such a minimum sensitivity standard.

The transmitters and receivers of the present invention preferably comprise encoders and decoders. In a preferred embodiment of the present invention, the encoders and decoders utilize hopping-code technology to provide a secure remote control system. Preferably, the encoders and decoders of the transmitters, receivers, transponders and/or transceivers used in the practice of the present invention comprise microchips which encrypt and decrypt the transmissions. For example, an encoder microchip of a transmitter of the present invention may comprise a circuit in which an identification number is stored, a circuit in which a counter value is stored, a logic circuit that changes the value of the counter value when the transmitter/encoder is operated, and a non-linear encoding circuit to encode the counter value to generate a transmission value which is decodable by a decoder microchip to provide the counter value. A decoder microchip of a receiver of the present invention may comprise a circuit in which a second identification number is stored, a circuit in which the transmission value from the encoder microchip is received, a circuit in which the transmission value is decoded to generate from the transmission value a decoded counter value, and a circuit in which a second decoded counter value obtained from a previous transmission value is stored. In addition, the decoder microchip may include a circuit in which signals are scanned to identify transmission signals conforming to a specific format. Encoders and decoders for use in the practice of the present invention as described above are available from Microchip Technology Incorporated ("Microchip") located in Chandler, Ariz. In addition, and in the alternative, encoders and decoders as described in U.S. Pat. No. 6,175,312 titled "Encoder and Decoder Microchips and Remote Control Devices for Secure Unidirectional Communication" may be utilized in the practice of the present invention.

Preferably, the transmitters/receivers of the present invention include and utilize Microchip's HCS300 or HSC360 chip sets. The HSC300 and HSC360 devices are designed for secure Remote Keyless Entry (RKE) systems. Both of these devices utilize Microchip's patented KEELOQ® hopping-code technology. The HSC300 combines a 32-bit hopping code generated by a non-linear encryption algorithm, with a 28-bit serial number and 6 status bits to create a 66-bit transmission stream. The HSC360 combines a 32-bit hopping code generated by a non-linear encryption algorithm, with a 28/32 bit serial number and 7/3 status bits to create a 67-bit transmission stream. The length of the respective transmission streams eliminates the threat of code scanning. The code hopping mechanism makes each transmission unique, thus rendering code capture and re-send (code-grabbing) schemes useless. The encryption keys, serial numbers, and configuration data are stored in EEPROM, which is not accessible via any external connection. The encryption keys and code combinations are programmable but read-protected. The HSC300 and HSC360 operate over wide voltage ranges of 2.0V to 6.3V, and 2.0V to 6.6V, respectively.

Figure 4:
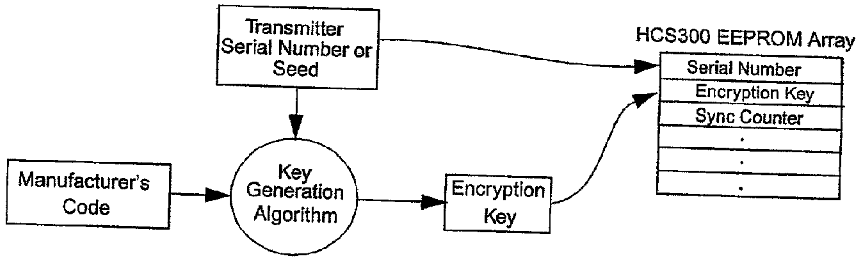
FIG. 4 is a block diagram illustrating the manner in which an encryption key is created and stored during production within a transmitter of the present invention.
Figure 5:
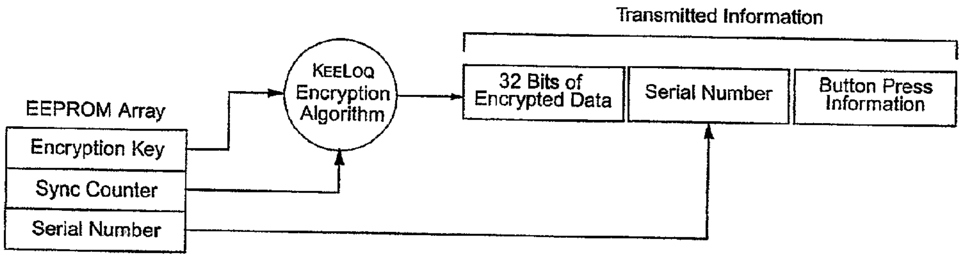
FIG. 5 is a block diagram illustrating the basic operation of the transmitter.

Preferably, each encoder, e.g., of a transmitter of the present invention, is programmed with the 28- or 32-bit serial number at the time of manufacture. This insures that each transmitter will be unique within a system. A 64-bit secret key is generated by a key generation function from the 28-bit or 32-bit serial number or a 32- or 48-bit seed and a 64-bit manufacturer's key as inputs. The generation of the secret key by using a key generation algorithm and the serial number and a 64-bit manufacturer's key as inputs is illustrated in FIG. 4. The manufacturer's key may be used to control the key generation function. The secret key is not readable and is never transmitted. The manufacturer's key/code is necessary in the receiver if a key generation function with a manufacturer's key/code was used to generate the secret keys. The manufacturer's key/code must be programmed into the receiver during manufacture. The manufacturer's key/code, according to the practice of the present invention, is generated and fixed by the assignee of this invention or some other standard-establishing organization. The key generation function is used to generate a unique key for each transmitter from the serial number or a seed value. It is preferable that the function is non-linear. This function is performed by the programming station to generate keys to be programmed into transmitters. In normal learn mode, the receivers preferably use the same information that is transmitted during normal operation to derive the transmitter's secret key, decrypt a discrimination value and a synchronization counter. All of the transmitter information is then stored. The discrimination value is a 12-bit fixed portion of the encrypted word. It is preferred in the practice of the present invention that the discrimination bits are the least significant bits of the serial number. It is used as a post decryption check. As shown in FIG. 5, the synchronization counter is a 16-bit counter that is incremented on every activation of the encoder. It is stored on the receiver controller and compared to determine if a transmission is a previously received transmission, in which case it is ignored or if it falls within a forward window in which case it is accepted. In the practice of the present invention it is preferred to use the normal learn mode, that is, seed transmissions are not used. However, if a secure learn mode is used, the transmitter is activated through a special button combination to transmit a stored 32- or 48-bit value (seed) that can be used for key generation or be part of the key. Transmission of the random seed can be disabled after learning is completed. The seed is programmed into the encoder, preferably it is 32- or 48-bit. This can be programmed to be the same as one half of the key or can be used in key generation. The seed is only transmitted when a special button combination is activated and as stated, can be disabled once learning is complete.

It is preferred that the transmitter of the present invention transmit a 66/67-bit transmission format. The 66-bit transmission may be composed of a 32-bit encrypted string, a 28-bit fixed string, a 4-bit function code, a battery low indicator, and a repeat indicator. The 67-bit transmission may be composed of a 32-bit encrypted string, a 28- or 32-bit fixed string, 4- or 0-function code, battery low indicator, and a 2-bit CRC. The fixed string is the serial number of the encoder and remains constant for all transmissions from a particular transmitter. However, the 32-bit encrypted string is unique for each transmission. It is preferred in the practice of the present invention that a Long Guard function is enabled and every fourth transmitted word is blanked to lower the RF duty cycle. The Baud Rate is preferably 100 microseconds.

Before a transmitter can be used with a particular receiver, the transmitter must be "learned" by the receiver. Upon learning a transmitter, information is stored by the receiver so that it may track the transmitter, including the serial number of the transmitter, the current synchronization value for that transmitter, and the same encryption key that is used on the transmitter. In the proposed system, the receiver includes memory for storing a table in which anywhere between 500 and 1000 pairs of serial numbers and synchronization values are stored. Upon filling of the memory, the data pairs stored in the table may be purged on a first-in, first-out basis.

Figure 6:
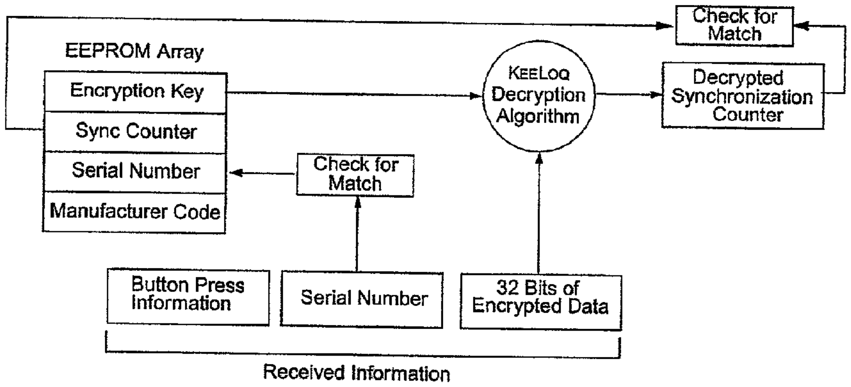
FIG. 6 is a block diagram illustrating the basic operation of a receiver of the present invention.

If the receiver receives a message of valid format, the discrimination bits are checked to verify the predetermined manufacturer's key. If the manufacturer's key is verified, then the serial number is checked and, if it is from a learned transmitter, the message is decrypted and the decrypted synchronization counter is checked against what is stored. If the synchronization value is verified not to exist in the table, or if the serial number does not exist in the table then the button status is checked to see what operation is needed. Typically, this will simply be a command to open and subsequently close a door. Nevertheless, various buttons may be employed for performing different operations. FIG. 6 shows the relationship between some of the values stored by the receiver and the values received from the transmitter.

While the present invention contemplates very specific parameters for the purpose of establishing a standard, it will be appreciated that such parameters may be varied from those stated above so long as the same parameters are consistently used so that all receivers complying with the standard will respond to all the complying transmitters.

As will be appreciated by those skilled in the art, the transmitters could include additional activation mechanisms for performing other functions such as calling an elevator, turning on the lights in a home or office, or opening a private door. The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A receiver for an automatic door assembly having a door and an actuator coupled to the receiver for automatically opening and closing the door in response to an activation signal, said receiver comprising:

- a receiver circuit for receiving hopping code control signal from a plurality of remote transmitters, the hopping code control signals each including a fixed serial number unique to the remote transmitter from which the control signal is transmitted, and a hopping code that changes with each transmission from the remote transmitter;

a memory in which a table is stored, said table including pairs of serial numbers and hopping codes of hopping code control signals as received from the plurality of remote transmitters; and a control circuit coupled to the actuator, said memory, and said receiver circuit, wherein said control circuit is configured to determine whether the serial number and the hopping code of any received hopping code control signal corresponds to one of the pairs of serial numbers and hopping codes previously stored in said table, said control circuit supplies the activation signal to the actuator when any received hopping code control signal has a serial number and hopping code pair that does not correspond to a serial number and hopping code pair previously stored in said table.

2. The receiver of claim 1, wherein the hopping code control signals received by said receiver circuit are RF signals.

3. The receiver of claim 1, wherein the hopping code of the hopping code control signals are encrypted and said control circuit decrypts the hopping code of the hopping code control signals received by said receiver circuit if the serial numbers correspond to any serial number already stored in said table.

4. The receiver of claim 3, wherein each encrypted hopping code includes specified bits of the corresponding serial number as discrimination bits, and a synchronization counter that changes with each transmission.

5. The receiver of claim 1, wherein said serial numbers are 32-bit serial numbers.

6. An automatic door assembly comprising the receiver of claim 1 and further comprising a door and an actuator for opening and closing said door, said actuator is responsive to an activation signal supplied from said control circuit.

7. A secure system to allow multiple users to remotely open/close a plurality of electronically actuated doors in numerous locations, said system comprising:

a plurality of transmitters, each of said transmitters transmitting open/close door signals including a fixed serial number unique to the transmitter and a hopping code that changes with each transmission; and a plurality of receivers in electrical communication with said plurality of electronically actuated doors to receive open/close door signals from said transmitters to initiate the opening of said doors in response to the receipt of said open/close door signals, each of said receivers including a memory circuit including a table in which pairs of serial numbers and hopping codes of any received open/close door control signals are stored, and a control circuit coupled to said memory circuit, wherein said control circuit is configured to supply an activation signal to open/close a door when any received open/close door signal has a serial number and hopping code pair that does not correspond to a serial number and hopping code pair previously stored in said table.

8. The system of claim 7, wherein each of said transmitters encrypts the hopping code of the open/close door signals and said control circuit of said receiver decrypts the hopping code of the open/close door signals received by said receiver.

9. The system of claim 8, wherein each encrypted hopping code includes specified bits of the corresponding serial number as discrimination bits, and a synchronization counter that changes with each transmission.

10. The system of claim 9, wherein, if said control circuit determines that appropriate discrimination bits are present and if the serial number of an open/close door signal received by said receiver corresponds to any serial number already stored in said table, said control circuit proceeds to supply an activation signal to open/close a door.

11. The system of claim 9, wherein before said control circuit supplies the activation signal, said control circuit determines whether appropriate discrimination bits are present in the received open/close door signal that corresponds to specified bits of the serial number.

* * * * *